(12) United States Patent
Ruiz Rodriguez

(10) Patent No.: US 6,499,190 B2
(45) Date of Patent: Dec. 31, 2002

(54) HANDLE FOR ELECTRIC ACCUMULATOR BATTERY

(75) Inventor: Rafael Ruiz Rodriguez, Guadalajara (ES)

(73) Assignee: Sociedad Espanola del Acumulador Tudor, S.A. (ES)

( * ) Notice: Subject to any disclaimer, the term of this patent is extended or adjusted under 35 U.S.C. 154(b) by 0 days.

(21) Appl. No.: 09/879,394

(22) Filed: Jun. 12, 2001

(65) Prior Publication Data

US 2002/0017008 A1 Feb. 14, 2002

(30) Foreign Application Priority Data

Jun. 13, 2000 (ES) .......................................... 200001583

(51) Int. Cl.⁷ ............................................... A45C 13/26
(52) U.S. Cl. .................. 16/423; 16/DIG. 15; 429/176; 429/187; 294/903
(58) Field of Search .......................... 16/422, 423, 425, 16/DIG. 15; 429/187, 176; 294/145, 169, 903

(56) References Cited

U.S. PATENT DOCUMENTS

| | | | | |
|---|---|---|---|---|
| 897,472 A | * | 9/1908 | Marx | ......................... 16/423 |
| 4,029,248 A | * | 6/1977 | Lee | .............................. 16/423 |
| 4,673,625 A | * | 6/1987 | McCartney et al. | .......... 16/423 |
| 5,232,796 A | * | 8/1993 | Baumgartner | ................ 16/423 |
| 5,624,772 A | * | 4/1997 | Mc Vey et al. | ................ 16/423 |
| 5,637,420 A | * | 6/1997 | Jones et al. | ............ 16/DIG. 15 |
| 6,022,638 A | * | 2/2000 | Horton et al. | ......... 16/DIG. 15 |
| 6,117,588 A | * | 9/2000 | Campbell et al. | ............. 16/423 |
| 6,153,331 A | * | 11/2000 | Brantley et al. | ............... 16/423 |

FOREIGN PATENT DOCUMENTS

| | | | |
|---|---|---|---|
| DE | 2422360 | * | 11/1974 |
| DE | 2305858 | * | 10/1976 |
| DE | 3801662 A1 | * | 9/1988 |
| DE | 20000776 U1 | * | 7/2000 |

* cited by examiner

Primary Examiner—Chuck Y. Mah
(74) Attorney, Agent, or Firm—Ostrolenk, Faber, Gerb & Soffen, LLP

(57) ABSTRACT

Handle for accumulator battery comprising a central grip and two steps on each side of the grip. The outer end walls of the steps have rounded perimeters. Each outer step is provided with an oval opening intended to cooperate with a respective pivot which the battery cover has on its opposite sides. The oval shape of the pivot cooperates with the oval shape opening due to their orientation to prevent removal of the handle at either a folded down or upraised orientation. The span of the first steps of the handle covers the terminals of the battery, and each first step permits anchoring of the cover-pieces over the terminals.

10 Claims, 5 Drawing Sheets

HANDLE FOR ELECTRIC ACCUMULATOR BATTERY

BACKGROUND OF THE INVENTION

The present invention relates to a handle for the transport and manipulation of electric accumulator batteries, preferably for batteries of the type for starting motor cars.

Since batteries have always been objects of great specific weight, there has been a constant endeavor to find the manner of facilitating their transport, storage and manipulation. The objective has become greater at the present time when a great many motor car batteries are sold in department stores, supermarkets and hypermarkets, where the customer collects the battery off-the-shelf and carries it off to mount in his vehicle by himself. The objective is facilitating the handling process by methods which in addition to enhancing the appearance of the battery, ensure safety, both through preventing the escape of the acid of the electrolyte, and by avoiding the risk of short circuit resulting from accidental electrical connection between the two poles or terminals.

Various types of handles are already known for facilitating the transport and manipulation of batteries, of which almost all utilize flexible elements such as plastic straps or cords in order that, while permitting the hand-carrying of the battery, and the mounting of the battery in the vehicle is not obstructed or even impeded. Also known are some rigid handles with different systems of lowering and fastening and swivelling the handle mentioned. But the majority of these must be removed from the battery when it is installed in the vehicle, in order to permit the assembly of the terminals with the pertinent clamps.

SUMMARY OF THE INVENTION

The handle of the present invention is rigid, permitting the handling of the battery with complete ease. Nevertheless, the handle presents no difficulty when mounting the battery, due to its special design.

The handle of the present invention has a double ladder configuration comprised of two steps on each side, with two windows or openings of non-round, and particularly oval shape at the lower ends situated in such a manner that it permits their fitting on and rotation about each of the side pivots joined to the upper part of the cover and at the same time permits it to be lowered on to the upper face or cover of the battery. This handle is specially designed in order to permit easy mounting due to the fitting of the windows of the handle on the pivots of the cover and also to permit the batteries to be stacked in the warehouse.

On lowering the handle on to the cover, the top part of the double ladder, which serves as the grip of the handle of the invention, is positioned between the battery connection terminals and precisely at the same height as the top part of the cover, projecting slightly over the top part of the lead terminals, in such a manner that the base is enlarged on which the batteries shall stand when stacked. Therefore, the risk of falling over is diminished, at the same time as the risk is minimized of breaks in or damage to the bottom or base of the batteries when they are stacked on top of each other, since the projecting parts which usually produce damage to the bottom of the batteries are the terminals themselves and these, when employing the design of the handle of the invention, are located at a lower level than the cover and the grip.

The pivots, around which the handle of the invention swivels, are situated on the two sides of the cover. The pivots are shaped like a mushroom, the outer part of which is non-round, and particularly oval in form and thicker than the inside which is circular in order to permit the handle to turn. The outermost and oval-shaped part of the pivots is dimensionally slightly less than the oval in the openings in the handle and the major axis of the oval of the pivots forms an angle of less than 90°, preferably 65° to the horizontal, in such a manner that it only permits the handle to be mounted when the latter is positioned forming that angle to the horizontal.

The fitting of the handle on the pivots of the cover is carried out by means of a simple movement and with virtually minimum force. However, once the handle is engaged, it accepts displacement and rotation with ease and with maximum guarantee of safety because the cover shall be unable to withdraw from its engagement while the handle is maintained upright forming an angle of 90° to the horizontal, which is the only position in which it is possible to transport the battery suspended from its handle. The handle can only be detached when it forms the same angle with the horizontal as that of the outermost part of the pivots and this is always much less than 90°, normally 65°. Therefore, during the transport of the batteries suspended from their handle, that is when the handle is raised, there is no risk of batteries falling as a result of aforesaid handle escaping from its engagement.

The material employed to fabricate the handles can be of many types. Preferably, for practical and decorative reasons, the same material is employed as that used in the manufacture of the covers and of the pivots about which it has to work.

As handles are used for transporting batteries, one of the problems that most regularly arises is that of having to detach the handles in order to prevent them striking against the covers of the batteries when these are subjected to vibration due to the motion of the vehicle. In the present invention this problem has been resolved through including on the cover two nipples which have to be inserted in the two recesses that are located on the ends of the lower part of the grip of the handle when the latter is lowered, in such a manner that handle and cover are firmly joined and are capable of withstanding the vibrations resulting from the motion of the vehicle without producing impacts.

Additionally, the handle of the present invention includes three holes situated on the upper part and on each of the two sides that surround the terminal of each polarity. Into these holes are inserted the nipples which are included on the lower part of some special pieces that cover the battery terminals, while the battery is in storage or is being transported to the vehicle in which it shall be mounted. These terminal cover-pieces with which the handle is provided protect the terminals from any possible short circuit, and contribute to better identification of the polarity of the battery, given that they are marked with the positive and negative signs.

To provide a better understanding of the present invention, a detailed description is given hereunder with reference to the drawings appended, in which has been represented by way of illustrative example, an embodiment of the handle in accordance with the principles of the invention.

DESCRIPTION OF A PREFERRED EMBODIMENT

Figure 1:
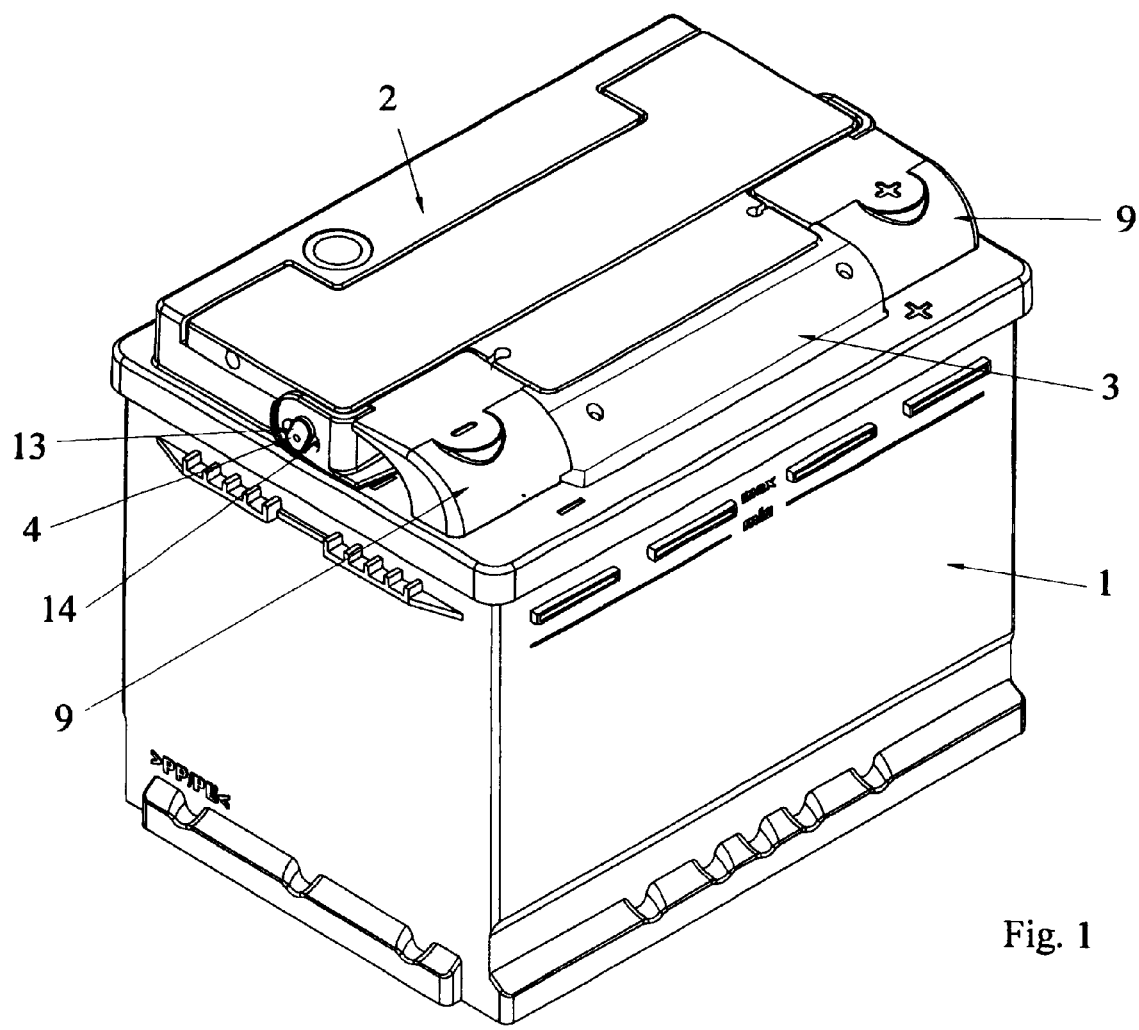
FIG. 1 shows, in a view in perspective, a battery of accumulators which incorporates a handle in accordance with the present invention.

With reference to the Figures and more specifically to FIG. 1, a case 1 of the battery contains inside it electrodes and an electrolyte and is enclosed on the top side with the cover 2.

Figure 2:
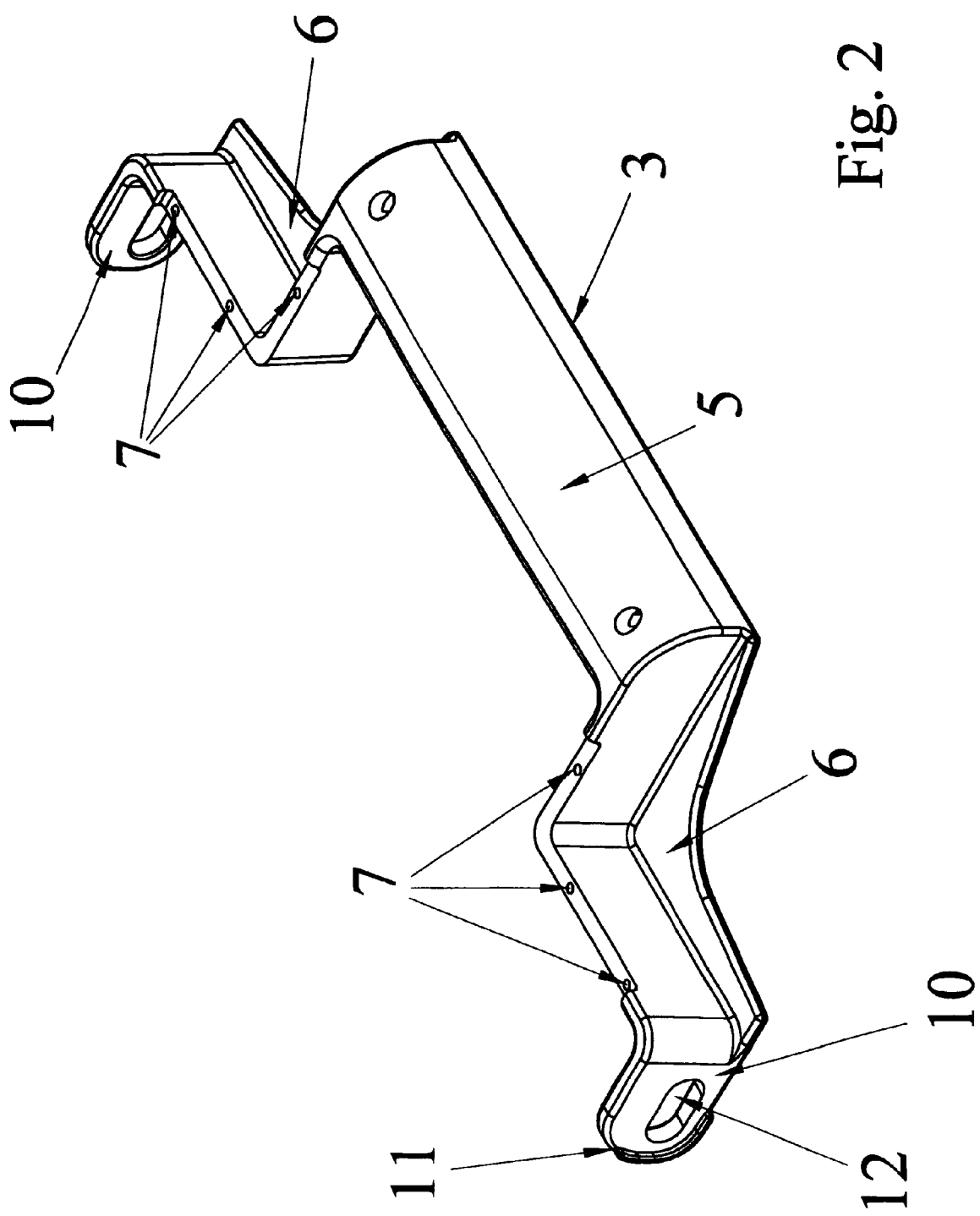
FIG. 2 shows a view in perspective of the handle, seen from above.

The cover 2 has a special design to permit collocating of the handle 3 of the invention. For this purpose the cover 2 is provided with two opposite side pivots 4 around which the handle 3 swivels. As may be better appreciated in FIGS. 2 and 3, the handle 3 has the form of a double ladder, with two steps on each opposite side. The grip 5 comprises the central part. The span, which forms the first step of each side, is strengthened with a bracket-shaped web 6, that house the terminals of the battery. The walls that form the span are provided on their upper part with holes 7 which cooperate with the nipples 8, that are present on each of the terminal cover-pieces 9 for fastening these pieces 9 to the handle. The pieces 9 cover (compare FIGS. 1 and 5) and prevent possible damage to the terminals during storage and transport of the battery and prevent the occurrence of short circuits.

The two ends of the handle are formed by walls 10 with the extreme edges 11 rounded and strengthened and each is provided with a non-round, and particularly an oval shape opening 12.

The oval openings 12 cooperate with the respective opposite pivots 4 of the cover 2. For this purpose, the pivot 4 has an outer part 13, that is also correspondingly non-round, and particularly oval in shape, but is of smaller dimensions than those of the oval shaped openings 12 of the handle and has an inner cylindrical part 14 of length slightly greater than the thickness of the walls 10 of the handle and has a diameter less than the minor axis of the oval opening 12. The outer part 13 is oriented with the major axis of the oval at an angle of less than 90° and preferably 65° to the horizontal so that the oval opening of the handle fits over the outer part enabling placement on or removal of the handle, when the handle is neither folded down on the battery cover or upraised for carrying the battery.

Figure 3:
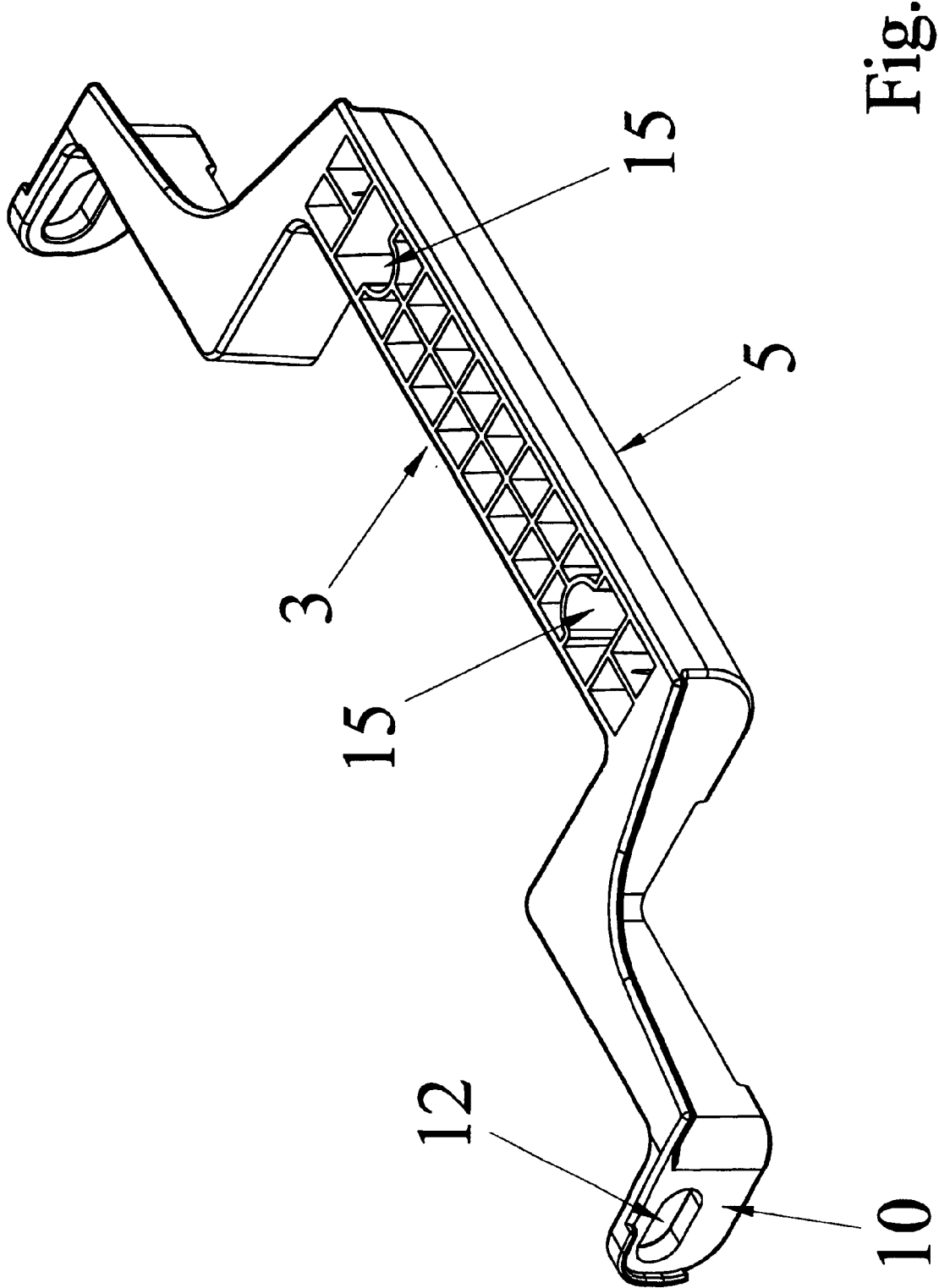
FIG. 3 shows a view in perspective of the handle, seen from below.
Figure 4:
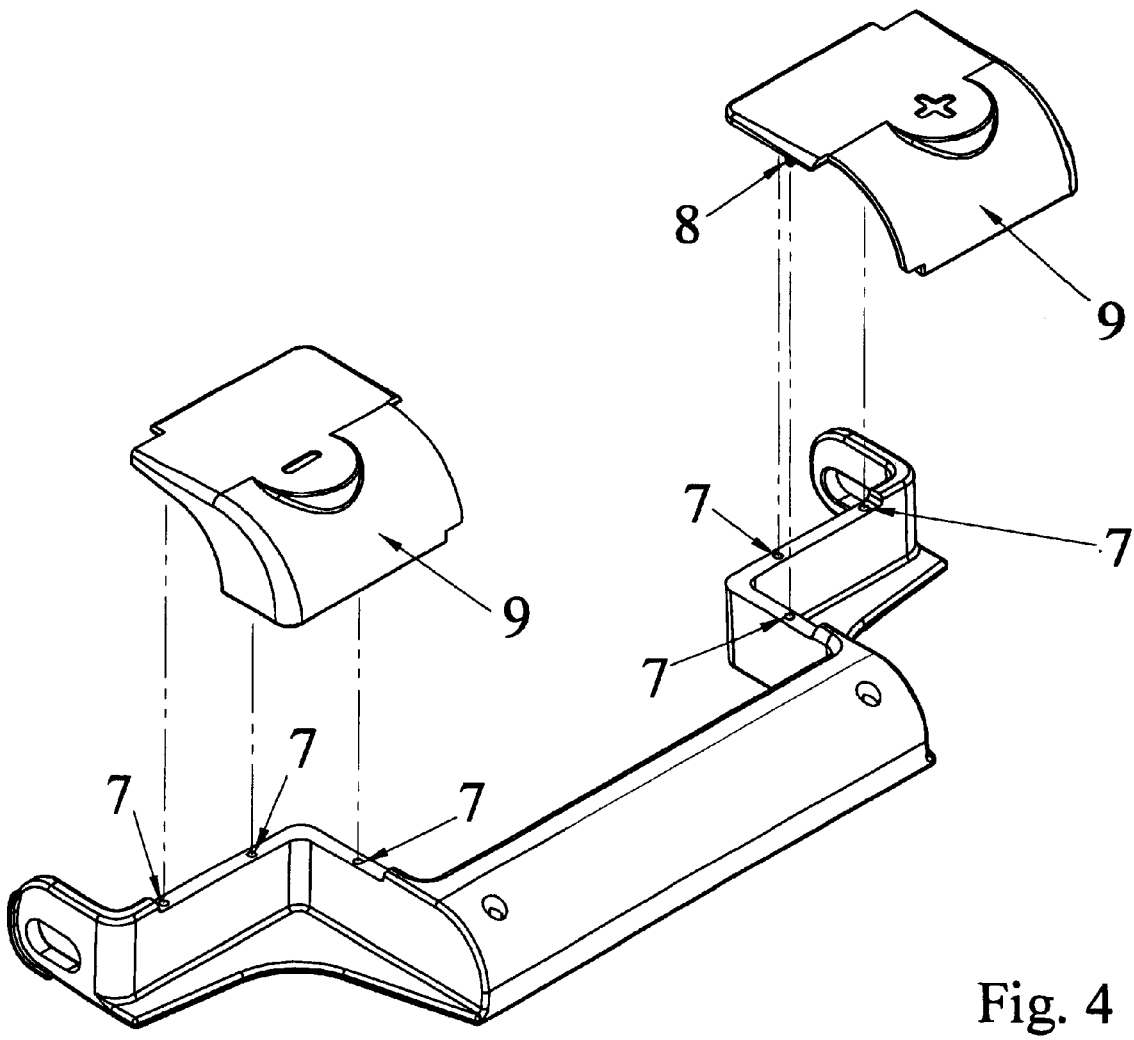
FIG. 4 shows a view of the handle similar to that of the FIG. 2, showing the manner in which the terminal cover-pieces are mounted.
Figure 5:
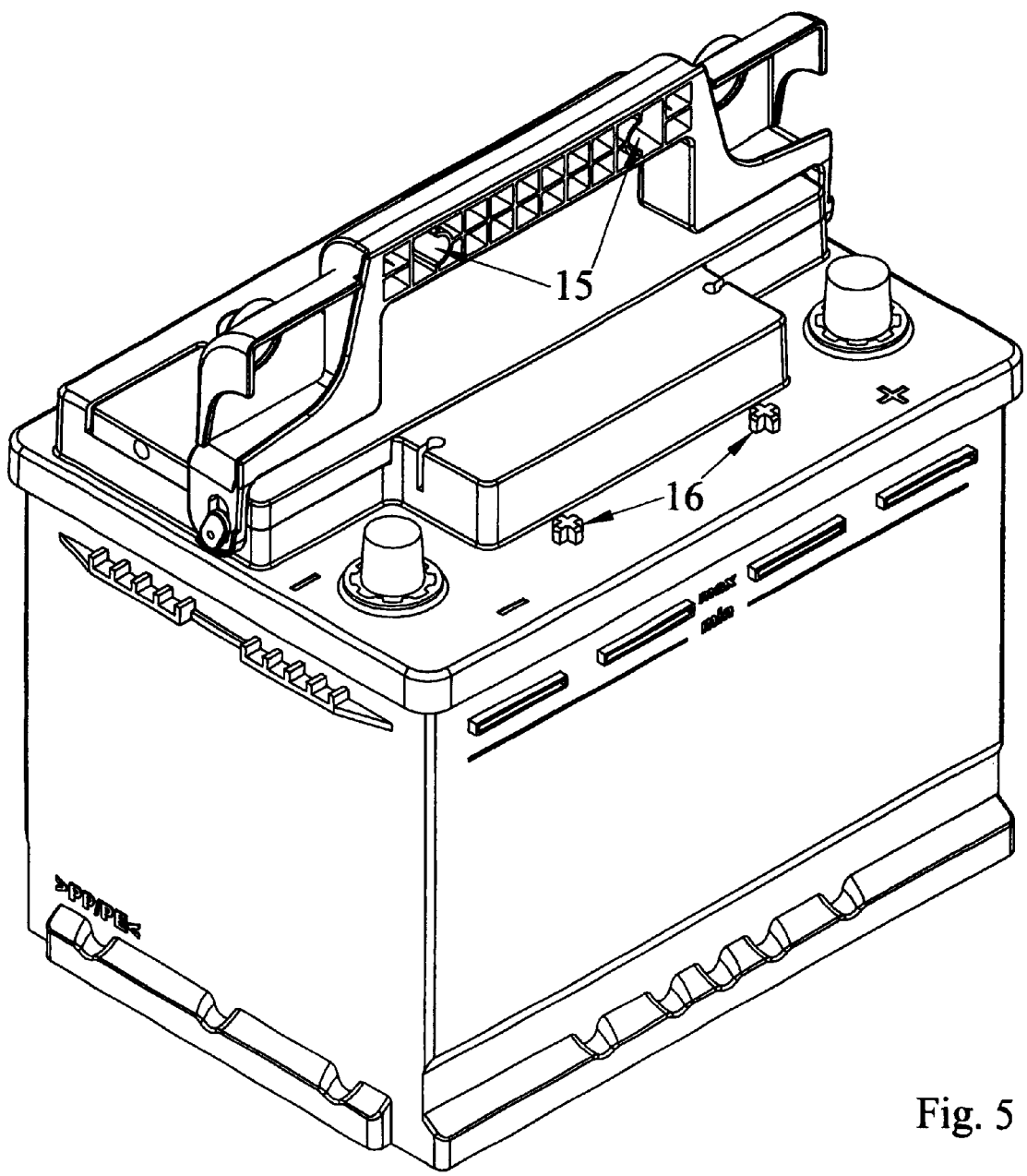
FIG. 5 shows a view of the battery which incorporates the handle in its position for transporting.

FIG. 3 shows that the handle 3 in the region of the grip 5 is provided with cavities 15 which cooperate with the fixed nipples 16 provided on the cover 2 of the battery, as can be seen in FIG. 5, to prevent the handle being able to move and strike the cover n with vibration resulting from the motion of the vehicle.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A handle for an electric accumulator battery, wherein the battery has a battery cover with opposite projecting pivots, the battery cover pivots each including an outer portion that is oval in shape with a first oval dimensions and an inner portion near the cover and of a second smaller size;

the handle for the battery comprising a central portion and opposite end regions, each end region comprising two steps; one step being the outer step, an oval shape opening passing through the outer step for cooperating with the respective one of the pivots on the battery cover, the oval shape opening being of third oval dimensions, such that the pivot outer portion first oval dimensions are slightly less than the third oval dimensions of the openings, and the inner portion of the pivot of second dimension is also of a length greater than the thickness of the one step at the opening and has a dimension less than the minor axis of the oval opening, such that with the oval openings of the handle aligned with the oval shape of the pivots, the handle may be placed on or removed from the pivots and with the handle placed over the pivots with the openings being on the inner portions of the pivots, and the oval shapes of the pivots being misaligned with respect to the oval shapes of the oval shape openings, the angle of orientation of the non-round shape of the outer portions of the pivots being such that the non-round openings in the steps of the handle will not align with the non-round shape of the pivots when the handle is either in a storage position down on the battery or the handle is in an upraised position for carrying the battery by the handle attached on the pivots.

2. The handle and battery of claim 1, wherein the inner portions of the pivots have a diameter that is slightly less than the minor axis of the oval shape openings.

3. The handle of claim 1, wherein the two steps include an inner step at each lateral side of the handle and the inner step has a span that is shaped and positioned to house terminals of the battery when the battery has terminals located and shaped as to be spanned by the inner step of the handle.

4. The handle of claim 3, wherein each inner step of the handle includes an upper part of a wall when the handle is folded down to the battery, orifices in the upper part of the wall, and terminal cover pieces provided with nipples for being received in the orifices on the upper part of the wall when the handle is folded down to the battery.

5. The handle of claim 1, wherein the outer step at each lateral side of the handle is rounded and includes a strengthened perimeter.

6. The handle of claim 1, wherein the outer portions of the pivots on the battery cover are oriented so that the major axis of their oval shape is less than 90° to the horizontal.

7. The handle of claim 6, wherein the angle of orientation of the oval shape of the outer portions of the pivots is such that the oval openings in the steps of the handle will not align with the oval shape of the pivots when the handle is either in a storage position down on the battery or the handle is in an upraised position for carrying the battery by the handle attached on the pivots.

8. The handle of claim 1, wherein the central part of the handle between the two steps at each lateral side constitutes the grip of the handle.

9. The handle of claim 8, wherein the grip of the handle includes cavities therein and nipples provided on the cover of the battery for being received in the cavities in the handle to inhibit movement of the handle off the battery cover.

10. A handle for an electric accumulator battery, wherein the battery has a battery cover with opposite projecting pivots, the battery cover pivots each including an outer portion that is non-round in shape with first dimensions and an inner portion near the cover and of a second smaller size;

the handle for the battery comprising a central portion and opposite end regions, each end region comprising two steps; one step being the outer step, a non-round shape opening passing through the outer step for cooperating with the respective one of the pivots on the battery cover, the non-round opening being of third non-round dimensions, such that the pivot outer portion first non-round dimensions are slightly less than the third non-round dimensions of the openings, the non-round shape having a longer and a shorter dimension; and the inner portion of the pivot of second dimension is also of a length greater than the thickness of the one step at the opening and has a dimension less than the minor axis of the non-round opening, such that with the non-round openings of the handle aligned with the non-round shape of the pivots, the handle may be placed on or removed from the pivots with the handle placed over the pivots with the openings being on the inner portions of the pivots, and the non-round shapes of the pivots being misaligned with respect to the non-round shapes of the non-round shape openings, the angle of orientation of the non-round shape of the outer portions of the pivots being such that the non-round openings in the steps of the handle will not align with the non-round shape of the pivots when the handle is either in a storage position down on the battery or the handle is in an upraised position for carrying the battery by the handle attached on the pivots.

* * * * *